United States Patent

[11] 3,573,791

[72] Inventor Karl O. H. Hesse
Arlington, Va.
[21] Appl. No. 789,568
[22] Filed Jan. 7, 1969
[45] Patented Apr. 6, 1971
[73] Assignee International Business Machines Corporation
Armonk, N.Y.

[54] MILTIPLE USE INDICATOR
7 Claims, 1 Drawing Fig.

[52] U.S. Cl. .......... 340/339, 340/336
[51] Int. Cl. .......... G08b 5/36
[50] Field of Search .......... 340/336, 339, 324

[56] References Cited

UNITED STATES PATENTS

| | | | |
|---|---|---|---|
| 3,146,436 | 8/1964 | Crow | 340/336 |
| 3,147,469 | 9/1964 | Buchsbaum | 340/336 |
| 3,307,169 | 2/1967 | Beck | 340/324 |
| 3,389,389 | 6/1968 | Minear | 340/339 |
| 3,493,957 | 2/1970 | Brooks | 340/339X |
| 3,505,672 | 4/1970 | Chisholm | 340/336X |

*Primary Examiner*—Alvin H. Waring
*Assistant Examiner*—David L. Trafton
*Attorneys*—Hanifin and Jancin and Keith T. Bleuer

ABSTRACT: A display system including a seven-bar indicator controlled by logic circuitry to selectively display in binary form coded input characters or to display the number of input characters entered into a register.

PATENTED APR 6 1971 3,573,791
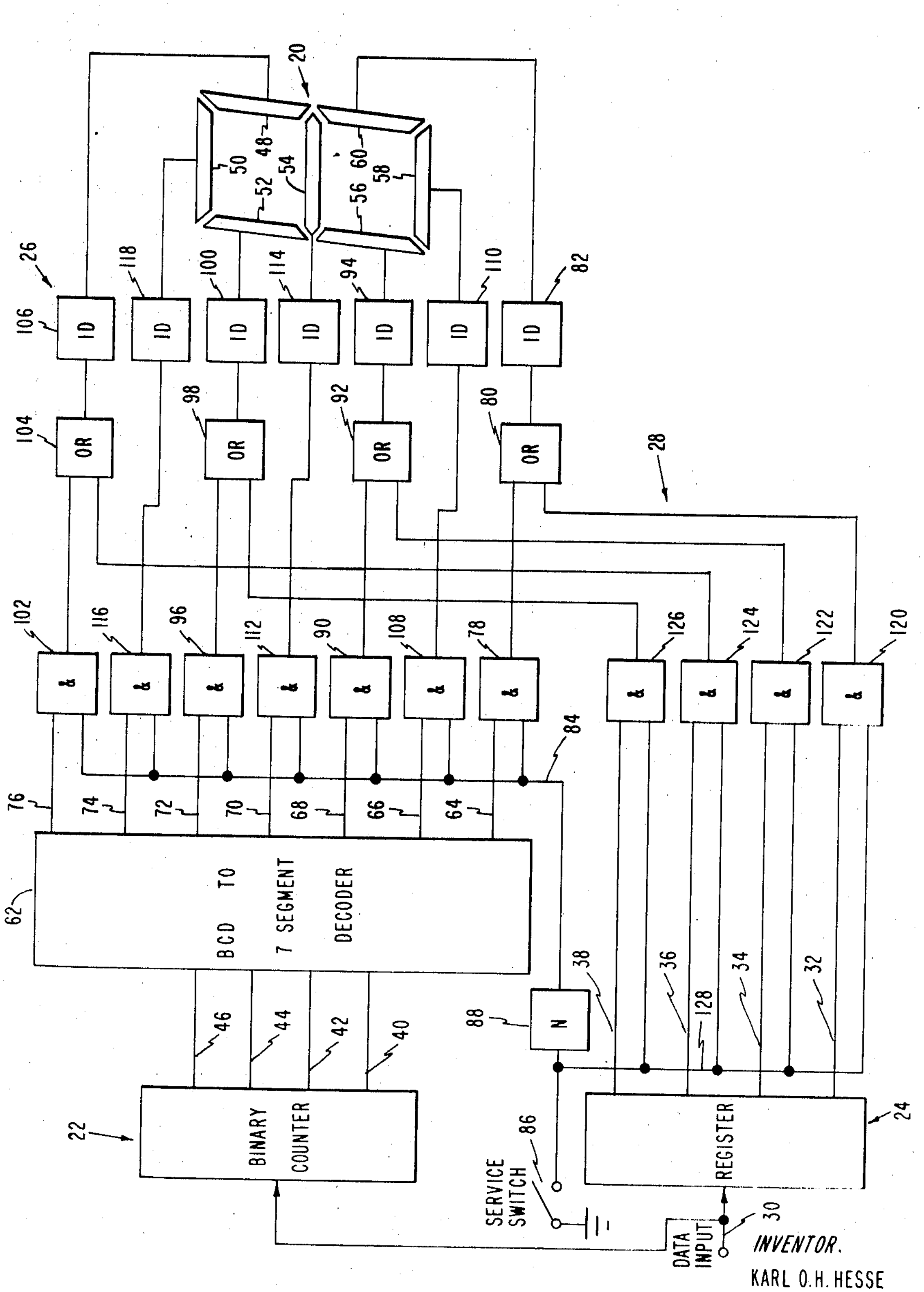
INVENTOR.
KARL O.H. HESSE
BY Keith J. Bleue
ATTORNEY

MILTIPLE USE INDICATOR

The invention relates to display systems and more particularly to such systems comprising a plurality of separately energizable illuminable display elements, such as segments or bars, so positioned in configuration that, when selectively lighted, they may indicate a character such as an arabic numeral.

It is conventional to utilize such a visual display, such as a seven-bar indicator, which is so connected with a counter as to indicate, with an arabic numeral, the number of characters entered into a storage register; and it is an object of the present invention to provide selectively operable circuitry in connection with such a display whereby, in lieu of the contents of the counter, the contents of the register in binary form may be indicated on the bar indicator, with various ones of the bars being lighted to correspond with the binary content of the register.

In a preferred form of the invention, a visual display of the seven-bar indicator type is utilized; and various ones of the bars are lighted to indicate with an arabic numeral the number of characters entered into a storage register, with a binary counter being provided to count the number of characters entered into the register and being connected by circuitry with the visual display including a binary coded decimal to seven-bar decoder. Selectively operable circuitry is provided to disenable the connection between the counter and the seven-bar indicator and to instead establish an operative connection between the storage register and the seven-bar indicator so that the binary contents of the register are shown on the indicator, with individual ones of the bars being lighted to correspond to the various binary values of the character existing in the register.

The invention consists of the novel constructions, arrangements, and devices to be hereinafter described and claimed for carrying out the above-stated objects, and such other objects, as will be apparent from the following description of a preferred embodiment of the invention, illustrated with reference to the accompanying drawing in which the single FIG. shows schematically a display system including circuitry connecting a visual display with a binary counter and a binary register and incorporating the principles of the invention.

Referring now to the drawing, the illustrated display system may be seen to comprise, in general, a visual display 20, a binary counter 22, a binary register 24, control circuitry 26 for effectively connecting the binary counter with the display 20 so that an arabic numeral is indicated by the display 20 which is equal to the entry made into the binary counter 22, and other control circuitry 28 which may selectively be made operative in lieu of the control circuitry 26 so that the visual display 20 indicates the binary contents of the register 24.

The binary counter 22 and the register 24 are both connected to a lead 30 which constitutes a source or input of binary data represented by different characters made up of different combinations of binary values. The register 24 has output leads or terminals 32, 34, 36, and 38; and the register 24 is of such construction as to receive and store each of the characters from the lead 30 and provide output voltages on the terminals 32, 34, 36, and 38 which correspond to the particular characters entered into the register 24, with the leads 32, 34, 36, and 38 respectively representing the binary values 1, 2, 4, and 8.

The binary counter 22 has output leads or terminals 40, 42, 44, and 46. The counter 22 is of such construction that the counter is advanced one count for each new character that is entered into the register 24 from the data input lead 30; and the count is indicated on the output leads 40, 42, 44, and 46 in binary form, with these leads respectively representing binary values 1, 2, 4, and 8.

The display 20 is a conventional type, being of the type, for example, disclosed in Knight U.S. Pat. No. 3,289,197 and comprises display elements 48, 50, 52, 54, 56, 58, and 60; and these display elements are in the form of bars or segments arranged in the form of the arabic numeral 8. These display elements 48—60 may be electroluminescent panels, elongated incandescent bulbs, gas-filled tubes, incandescent bulbs illuminating translucent display plates, or the like. The elements 48—60 are arranged in a block 8 in two parallelograms, one over the other, and having a side in common. The top parallelogram, starting from the right side and progressing counterclockwise, includes elements 48, 50, 52, and 54; and the lower parallelogram, starting from the common element 54, includes the additional elements 56, 58, and 60.

The control circuitry 26 comprises a conventional BCD (binary coded decimal) to seven-bar or segment decoder 62, and the decoder 62 is connected to the output terminals or leads 40—46 of the binary counter 22. The decoder 62 has seven output leads 64, 66, 68, 70, 72, 74, and 76; and the leads 64—76 are respectively connected, through circuits to be hereinafter described, with the seven display elements 60, 58, 56, 54, 52, 50, and 48, so that, when each of these leads has a signal applied to it, the respective display element is lighted. The decoder 62 is of such construction that the particular elements 48—60 of the display 20 will be lighted to indicate with an arabic numeral the decimal sum of the signals supplied to the leads 40—46, and the corresponding leads 64—76 will have signals supplied to them from the decoder 62 for so lighting these particular display elements 48—60.

The output lead 64 of the decoder 62 is connected to the display element 60 through AND circuit 78, OR circuit 80, and display element indicator driver 82. The driver 82 may be of any conventional type suitable for supplying current to the associated display element 60, and may, for example, be of the type of control switch as is shown in Knight U.S. Pat. No. 3,289,197 in conjunction with the lighted elements of the display system therein described.

AND circuit 78 will, of course, pass the signal on lead 64 to driver 82 via OR circuit 80 only if AND circuit 78 is enabled or conditioned for passing the signal therethrough; and this is accomplished by a second signal applied to the input side of the AND circuit 78 by means of a lead 84 connected to the AND circuit 78. The lead 84 is connected to a selectively operable service switch 86 through an inverter circuit 88.

Leads 68, 72, and 76 have the same types of connection with the respective display elements of the display 20 as the lead 64 has with respect to the display element 60; and the connections include AND circuit 90, OR circuit 92, and driver 94 for the lead 68; AND circuit 96, OR circuit 98, and driver 100 for the lead 72; and AND circuit 102, OR circuit 104, and driver 106 for the lead 76. The connection of the lead 66 with the display element 58 includes an AND circuit 108 corresponding to the AND circuit 78 and a driver 110 corresponding to the driver 82. The leads 70 and 74 have connections to their respective display elements of the display 20 similar to the connection of the lead 66 to the element 58; and the connection for the lead 70 includes the AND circuit 112 and driver 114; and the connection for the lead 74 includes the AND circuit 116 and the driver 118. The AND circuits 108, 90, 112, 96, 116, and 102 are connected to the lead 84 so as to be enabled along with and at the same time as the AND circuit 78.

The control circuitry 26 as just described provides for a lighting of the particular display elements 48—60 of the display device 20 which will provide an indication of the proper arabic numeral corresponding to the count reached in the binary counter 22 and to the sum of the binary values of the signals on the leads 40—46; and the switch 86, when closed, disenables the control circuitry 26 and instead enables the control circuitry 28 so as to cause various elements of the display device 20 to be lighted in accordance with the binary contents of the register 24.

The control circuitry 28 includes AND circuits 120, 122, 124, and 126 which are respectively connected to the output terminals or leads 32, 34, 36, and 38 of the register 24. The AND circuits 120—126, of course, will only pass signals from the leads 32—38 when enabled; and the AND circuits 120—126 are all connected to a lead 128 which, in turn, is connected to the service switch 86 for providing an enabling signal to the AND circuits 120—126. The AND circuits 120—126 are connected on their output sides respectively to the OR circuits 80, 92, 98, and 104.

In operation, data characters in binary form are entered successively in the storage register 24 from the input lead 30. Each of these characters provides, in accordance with the contents of the character, a signal on any one, or more than one, of the output leads or terminals 32, 34, 36, and 38. Each time an entry is so made in the register 24 (with any prior characters in the register being erased), the binary counter 22 is advanced one count; and the count existing in the binary counter is indicated by signals on one or more of the output leads or terminals 40, 42, 44, and 46 of the counter 22. The first count will be indicated by a signal on the lead 40, the second count will be indicated by a signal on the lead 42, the third count will be indicated by a signal on both leads 40 and 42, etc.

Assuming that the switch 86 is open, the decoder 62 will be operative to supply signals by means of the appropriate ones of the output leads 64—76 to the particular ones of the display elements 48—60 which will cause an arabic numeral to appear from the lighted elements of the display 20 corresponding to the count in the binary counter 22 and to the composite value of the binary values of signals on the leads 40—46. Since the service switch 86 is open, the inverter circuit 88 supplies a continuous signal to the input side of each of the AND circuits 78, 108, 90, 112, 96, 116, and 102; and, therefore, signals in any of the leads 64—76 may pass through these AND circuits which are in series with these leads. The drivers 110, 114, and 118 are connected directly to the AND circuits 108, 112, and 116; and signals, therefore, from these AND circuits may directly energize these drivers which, in turn, are effective to supply lighting current to the respective display elements 58, 54, and 50. The OR circuits 80, 92, 98, and 104 are, of course, effective to pass a signal from the AND circuits 78, 90, 96, and 102 for energizing the respective drivers 82, 94, 100, and 106; and signals from the AND circuits 78, 90, 96, and 102 are thus effective to cause a lighting of the respective display elements 60, 56, 52, and 48.

As an example, when the lead 46 has a signal supplied to it corresponding to the binary value of 8 and a count of 8 in the counter 22, all of the leads 64—76 will have signals supplied to them from the decoder 62; and all of the AND circuits 78, 108, 90, 112, 96, 116, and 102 and all of the OR circuits 80, 92, 98, and 104 will transmit signals for energizing all of the drivers 82, 110, 94, 114, 100, 118, and 106 in order to cause the lighting of all of the elements 48—60 of the display device 20 so that the display device 20 indicates an arabic 8 corresponding to the binary value of 8 of the signal supplied on the lead 46 and to the count of eight in the binary counter 22.

As another example, if signals are supplied to the leads 42 and 44, corresponding to binary value of 4+2, or 6, and to the count of 6 in the counter 22, signals will be supplied by the decoder 62 to the output leads 64, 66, 68, 70, and 72 to be transmitted through the respective AND circuits and OR circuits connected to these leads for energizing the drivers 82, 110, 94, 114, and 100 so that the elements 60, 58, 56, 54, and 52 of the display device 20 are lighted, indicating the arabic numeral 6 corresponding to the binary values of the signals supplied to 2 two and 4 input leads 42 and 44 and to the count of 6 in the counter 22. Correspondingly, the circuitry 26 will be operative to indicate the other arabic numerals on the display device 20 corresponding to the counts in the counter 22 and to the other sums of the signals on the 1, 2, 4, and 8 leads 40—46, up to the high value of 9.

The circuitry 28 is selectively made operative in lieu of circuitry 26 by closing the service switch 86, in order to indicate the binary value of a character in the storage register 24 by lighting various ones of the display bars 60, 56, 48, and 52. With the service switch 86 closed, all of the AND circuits 78, 108, 90, 112, 96, 116, and 102 are disabled, since the inverter circuit 88 is no longer effective to provide an enabling signal to these AND circuits; and signals cannot thereafter pass from the output leads 64—76 of the decoder 62 to the drivers 82, 110, 94, 114, 100, 118, and 106 for lighting of any of the elements 48—60 of the display device 20. The switch 86 is connected to the input sides of the AND circuits 120—126 through lead 128; and the switch 86, when closed, enables all of the AND circuits 120—126. If a signal is present on the output lead 32 of the register 24, indicating that a certain character has been entered in the register 24 which includes the binary value of 1, the signal is transmitted through the enabled AND circuit 120 to the OR circuit 80 and to the driver 82 so that the display element 60 is lighted indicating that such a signal has been applied to the lead 32 and that a character is present in the register 24 that includes the binary value of 1. Correspondingly, when binary 2, 4, or 8 signals are present on the leads 34, 36, and 38, indicating that characters are stored in the register 24 which include the binary values of 2, 4, or 8, the signals on these leads are transmitted through the AND circuits 122, 124, and 126 and the OR circuits 92, 104, and 98 to respectively energize the drivers 94, 106, and 100. Thus, when the character in the register 24 includes the binary value of 2 and the output lead 34 has a signal supplied to it, the corresponding display element 56 is lighted; when the character in the register 24 includes the binary value of 4 and a signal is supplied to the lead 36, the corresponding display element 48 is lighted; and when the character stored in the register 24 includes the binary value of 8 and a signal is supplied to the lead 38, the corresponding display element 52 is lighted. It will be noted that a signal on any of the output leads or terminals 32, 34, 36, and 38 from the register 24 is effective to cause the lighting of only one of the display elements 60, 56, 48, and 52; and this is in contrast to the action of a signal on any one of the output leads or terminals 40, 42, 44, and 46 from the binary counter 22 which is effective, due to the action of the decoder 62, to cause the lighting of more than one of the display elements 48—60 of the display 20.

The display system herein disclosed advantageously allows the single visual display 20 to be used for two purposes, namely, to indicate the number of characters that have been entered successively into the register 24 or selectively, at the will of the operator, to indicate the binary composition of any one character in the register 24. The control circuitry 26 effectively connects the display 20 with the binary counter 22 so that the display indicates the arabic numeral corresponding to the count in the counter circuits; the number of characters entered successively into the storage register 24. If the operator desires to know the composition of any of these characters entered into the register 24, he may, at the time the character is in the register 24, render the control circuitry 28 operative and render the circuitry 26 inoperative by closing the switch 86; and the circuitry 26 at this time operatively connects the storage register 24 with the visual display 20 so that the binary values of 1, 2, 4 and 8, constituting the constituent parts of the character in the register, are respectively shown by the bars 60, 56, 48, and 52 of the display 20.

I claim:

1. A display system comprising:

a visual display having a plurality of segments illuminated when energized and correlated with respect to each other to display a plurality of different characters depending on which ones of said segments are energized;

first control means connectable to said visual display to illuminate segments thereof to display arabic characters;

second control means connectable to said visual display to illuminate segments thereof to display characters in binary form; and selective means for alternately connecting said first control means and said second control means to said visual display so as to selectively display arabic characters and characters in binary form.

2. A display system as set forth in claim 1 and further comprising a source of data input in binary form, said second control means including a register connected to said data input source and storing characters in binary form from the data input source, said first control means including a binary counter connected to said data input source for counting and indicating in binary form the number of characters sequentially entered into said register.

3. A display system as set forth in claim 2, said visual display having seven of said segments which are arranged in the form of an arabic figure 8.

4. A display system as set forth in claim 2, said first control means including a decoder effectively connected between said binary counter and each of said segments so that said segments are illuminated to indicate the arabic numeral corresponding to the binary value of the count in said counter.

5. A display system as set forth in claim 4, said decoder having an output terminal corresponding to each of said segments and said register having an output terminal corresponding to certain ones of said segments, said selective means including means for disconnecting each of said terminals of said decoder with respect to its respective segment and at the same time connecting each of said terminals of said register with its respective segment.

6. A display system as set forth in claim 5, said selective means including also:

an AND circuit connected with each of said output terminals of said decoder;

an AND circuit connected with each of said output terminals of said register; and switch means for selectively disabling said AND circuits connected to said output terminals of said decoder and for at the same time enabling said AND circuits connected to said output terminals of said register.

7. A display system as set forth in claim 6, said switch means including a switch connected directly with each of said AND circuits connected with said output terminals of said register and including also an inverter circuit connected between said switch and each of said AND circuits connected with said output terminals of said decoder.